(12) United States Patent
Okamoto et al.

(10) Patent No.: US 12,330,538 B2
(45) Date of Patent: Jun. 17, 2025

(54) VEHICLE SEAT

(71) Applicant: TOYOTA BOSHOKU KABUSHIKI KAISHA, Aichi-ken (JP)

(72) Inventors: Naoya Okamoto, Aichi-ken (JP); Takuya Mizuno, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 220 days.

(21) Appl. No.: 18/200,667

(22) Filed: May 23, 2023

(65) Prior Publication Data

US 2023/0391231 A1 Dec. 7, 2023

(30) Foreign Application Priority Data

Jun. 1, 2022 (JP) .................. 2022-089533

(51) Int. Cl.
*B60N 2/08* (2006.01)
(52) U.S. Cl.
CPC ...................... *B60N 2/08* (2013.01)
(58) Field of Classification Search
CPC ........................................................ B60N 2/08
See application file for complete search history.

(56) References Cited

U.S. PATENT DOCUMENTS

| | | | | |
|---|---|---|---|---|
| 8,888,189 B2 * | 11/2014 | Tamura | ..................... | B60N 3/06 297/423.15 |
| 8,936,295 B2 * | 1/2015 | Slungare | ............ | B60N 2/02246 297/344.21 |
| 9,010,861 B2 * | 4/2015 | Seibold | ..................... | B60N 2/14 297/344.21 |
| 9,643,521 B2 * | 5/2017 | Frommann | ........... | B60R 21/207 |
| 9,669,738 B2 * | 6/2017 | Lemay | .................. | B60N 2/0806 |
| 10,059,232 B2 * | 8/2018 | Frye | .......................... | B60N 2/06 |
| 10,286,814 B2 * | 5/2019 | Ploch | ....................... | B60N 2/20 |
| 10,377,272 B2 * | 8/2019 | Yogo | ...................... | B60N 2/995 |
| 2020/0384897 A1 * | 12/2020 | Rogg | ........................ | B60N 2/08 |
| 2023/0391231 A1 * | 12/2023 | Okamoto | ............. | B60N 2/0818 |
| 2023/0415618 A1 * | 12/2023 | Mizuno | ................ | B60N 2/0224 |

FOREIGN PATENT DOCUMENTS

JP 7026198 B1 2/2022

* cited by examiner

*Primary Examiner* — Philip F Gabler
(74) *Attorney, Agent, or Firm* — Greenblum & Bernstein, P.L.C.

(57) ABSTRACT

A vehicle seat includes: a seat main body; a lock mechanism portion that restricts a rotational operation of the seat main body; an operation portion that is operated to cause the lock mechanism portion to perform an unlock operation; a first member to which an operation force from the operation portion is transmitted; a second member that transmits the operation force toward the lock mechanism portion; and an intermediate member that is disposed, when the seat main body is slid to a specific position, at a first position at which the intermediate member is engaged with the first member and the second member, the intermediate member being disposed, when the seat main body is slid to a position different from the specific position, at a second position at which the intermediate member is disengaged from the first member and the second member.

6 Claims, 9 Drawing Sheets

VEHICLE SEAT

CROSS REFERENCE TO RELATED APPLICATIONS

This nonprovisional application is based on Japanese Patent Application No. 2022-089533 filed on Jun. 1, 2022, with the Japan Patent Office, the entire contents of which are hereby incorporated by reference.

BACKGROUND OF THE INVENTION

Field of the Invention

The present invention relates to a vehicle seat.

Description of the Background Art

For example, Japanese Patent No. 7026198 discloses an interlock mechanism of a vehicle swivel seat.

An interlock mechanism includes: two vehicle body-side slide rails; two seat-side slide rails, an contact portion fixed on a side of a vehicle body; a stopper that is fixed on a side of a vehicle seat and comes into contact with the contact portion when the vehicle seat slides to a predetermined position; a restriction member that is attached on the side of the vehicle seat with an elastic body interposed therebetween, comes into contact with the contact portion before the vehicle seat slides to the predetermined position, and moves from a first position to a second position in a period until the contact portion comes into contact with the stopper; a rotation mechanism that can rotate the vehicle seat; and an obstruction plate that comes into contact with the restriction member to restrict the rotation when the restriction member is disposed at the first position and that does not come into contact with the restriction member and allows the rotation when the restriction member is disposed at the second position.

SUMMARY OF THE INVENTION

As disclosed in Japanese Patent No. 7026198 described above, there is known a vehicle seat including a lock mechanism portion for restricting or allowing a rotational operation of a seat main body.

In such a vehicle seat, in order to avoid, for example, interference between the seat main body and a structure around the seat main body, it is required to allow the lock mechanism portion to perform the unlock operation only when the seat main body is slid to a specific position. On the other hand, as a driving system of the lock mechanism portion, there is a system in which an operation force generated by a lever operation or the like by an occupant is transmitted to a lock mechanism portion via a cable or the like, thereby causing the lock mechanism portion to perform the unlock operation. The interlock mechanism disclosed in Japanese Patent No. 7026198 does not support such a driving system.

An object of the present invention is to solve the above issue and to provide a vehicle seat in which a lock mechanism portion is allowed to perform an unlock operation only when a seat main body is slid to a specific position.

[1] A vehicle seat includes: a seat main body that performs a slide operation and a predetermined operation independent of the slide operation; a lock mechanism portion that restricts the predetermined operation of the seat main body; an operation portion that is operated by an occupant to cause the lock mechanism portion to perform an unlock operation; a first member to which an operation force from the operation portion is transmitted; a second member that transmits the operation force toward the lock mechanism portion; and an intermediate member that is disposed, when the seat main body is slid to a specific position, at a first position with respect to the first member and the second member and at which the intermediate member is engaged with the first member and the second member, and performs transmission the operation force from the first member to the second member, the intermediate member being disposed, when the seat main body is slid to a position different from the specific position, at a second position with respect to the first member and the second member and at which the intermediate member is disengaged from the first member and the second member, and interrupts the transmission of the operation force from the first member to the second member.

With the vehicle seat configured as described above, when the seat main body is slid to the specific position, the operation force is transmitted from the first member to the second member via the intermediate member, so that it is possible to cause the lock mechanism portion to perform the unlock operation. On the other hand, when the seat main body is slid to a position different from the specific position, the operation force is not transmitted from the first member to the second member, so it is impossible to cause the lock mechanism portion to perform the unlock operation. Therefore, only when the seat main body is slid to the specific position, it is possible to cause the lock mechanism portion to perform the unlock operation.

[2] The vehicle seat described in [1], further includes: a lower rail fixed to a floor of a vehicle; an upper rail slidably assembled to the lower rail; and a base plate connected to the upper rail and on which the seat main body is mounted, wherein the first member and the second member are attached to the base plate, and the intermediate member is attached to the lower rail.

With the vehicle seat configured as described above, a positional relationship between the first member and the second member attached to the base plate and the intermediate member attached to the lower rail changes along with the slide operation of the seat main body. Therefore, it is possible to move, with a simple configuration, the intermediate member between the first position and the second position with respect to the first member and the second member.

[3] The vehicle seat according to [1] or [2], wherein each member of the first member and the second member is provided to be turnable about a first central axis, the intermediate member is provided to be turnable about a second central axis, the first member includes a first claw portion protruding outward in a radial direction of the first central axis, the second member includes a second claw portion protruding outward in the radial direction of the first central axis, at a position shifted with respect to the first claw portion in an axial direction and a circumferential direction of the first central axis, and the intermediate member includes a third claw portion that is interposed between the first claw portion and the second claw portion in the circumferential direction of the first central axis when the intermediate member is disposed at the first position.

With the vehicle seat configured as described above, by advancing and retracting the third claw portion with respect to a space between the first claw portion and the second claw portion, it is possible to selectively obtain a state in which the intermediate member is engaged with the first member and the second member and a state in which the intermediate member is disengaged with the first member and the second member.

[4] The vehicle seat according to [3], wherein the first central axis and the second central axis extend in a straight line when the intermediate member is disposed at the first position.

With the vehicle seat configured as described above, when the intermediate member is disposed at the first position, the first central axis and the second central axis, which are respectively a turning center of the first claw portion and the second claw portion and a turning center of the third claw portion, extend in a straight line. Therefore, when the first member, the second member, and the intermediate member turn about the first central axis and the second central axis, it is possible to maintain a positional relationship between the first and second claw portions and the third claw portion interposed between the first claw portion and the second claw portion.

[5] The vehicle seat according [1] or [2], wherein each member of the first member and the second member is provided to be turnable about a first central axis, the intermediate member is provided to be turnable about a second central axis, the first member includes a first gear portion having a plurality of teeth arranged in a circumferential direction of the first central axis, the second member includes a second gear portion having a plurality of teeth arranged, at a position shifted in an axial direction of the first central axis with respect to the first gear portion, in the circumferential direction of the first central axis, and the intermediate member includes a third gear portion having a plurality of teeth arranged in a circumferential direction of the second central axis and meshes with the first gear portion and the second gear portion when the intermediate member is disposed at the first position.

With the vehicle seat configured as described above, by advancing and retracting the third gear portion with respect to the first gear portion and the second gear portion, it is possible to selectively obtain a state in which the intermediate member is engaged with the first member and the second member and a state in which the intermediate member is disengaged with the first member and the second member.

[6] The vehicle seat according to any one of [1] to [5], wherein the seat main body performs a slide operation within a predetermined range in a front-rear direction, and the specific position is a rear end part of the predetermined range.

With the vehicle seat configured as described above, it is possible to cause the lock mechanism portion to perform the unlock operation only when the seat main body is made to slide to the rear end part of the predetermined range.

The above and other objects, features, aspects and advantages of the present invention will become apparent from the following detailed description of the present invention that should be understood in conjunction with the accompanying drawings.

DESCRIPTION OF THE PREFERRED EMBODIMENTS

Preferred embodiments of the present invention will be described with reference to the drawings. In the drawings referred to below, the same members or members corresponding thereto are denoted by the same reference numerals. Further, of a pair of left and right members, a reference number of the member on the right side of the seat may be attached with "R", and a reference number of the member on the left side of the seat may be attached with "L".

First Preferred Embodiment

Figure 1:
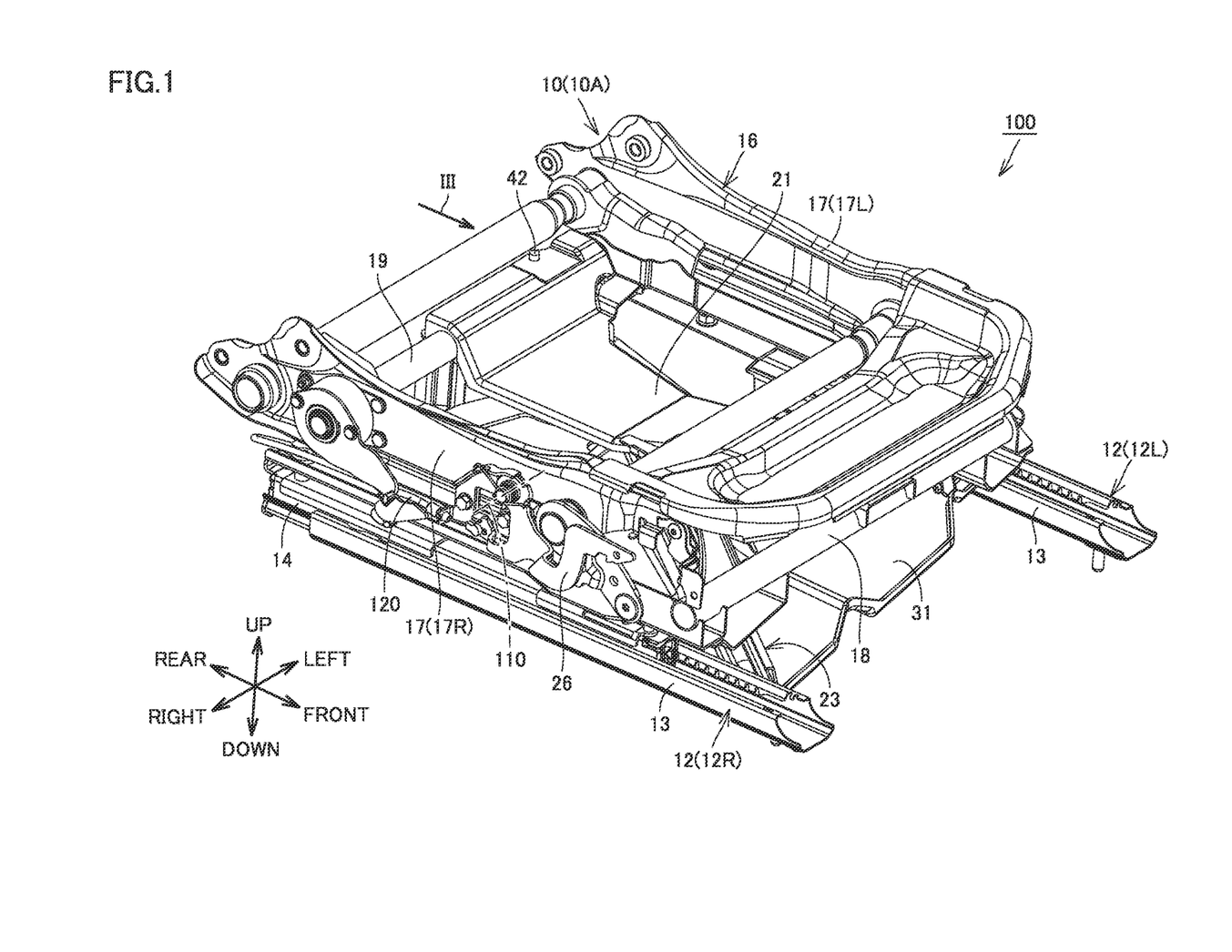
FIG. 1 is a perspective view illustrating a vehicle seat according to a first preferred embodiment of the present invention.
Figure 2:
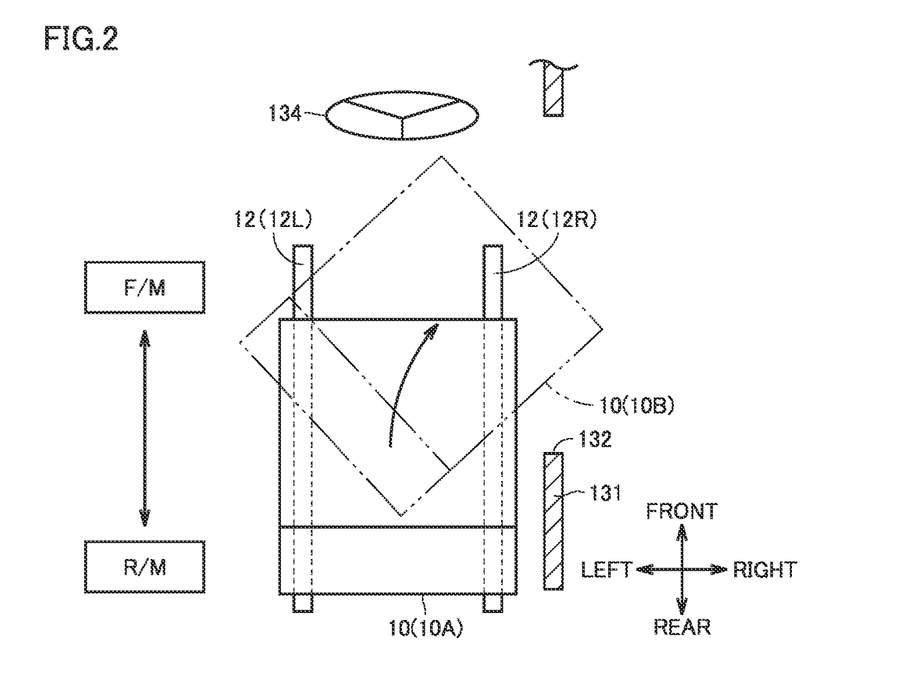
FIG. 2 is a top view illustrating an operation of the vehicle seat in FIG. 1.

FIG. 1 is a perspective view illustrating a vehicle seat according to a first preferred embodiment of the present invention. FIG. 2 is a top view illustrating an operation of the vehicle seat in FIG. 1.

With reference to FIGS. 1 and 2, a vehicle seat 100 according to the present preferred embodiment is mounted on a vehicle. Vehicle seat 100 is a driver's seat on which a driver of the vehicle sits.

Vehicle seat 100 includes a seat main body 10, slide rails 12 (12R and 12L), and a base plate 31.

Seat main body 10 is a main body portion of vehicle seat 100 including a seat cushion and a seat back.

Seat main body 10 includes a cushion frame 16. Cushion frame 16 constitutes a framework of the seat cushion. Cushion frame 16 includes side frames 17 (17R and 17L). Side frames 17 extend in a front-rear direction. Side frame 17R and side frame 17L are provided at an interval in a left-right direction. Side frames 17 may be provided with a lifter mechanism for raising and lowering the seat cushion.

Slide rails 12 support seat main body 10 to be slidably in the front-rear direction. Slide rail 12R and slide rail 12L are provided at an interval in the left-right direction. Slide rail 12R is provided below side frame 17R. Slide rail 12L is provided below side frame 17L.

Slide rails 12 each include a lower rail 13 and an upper rail 14. Lower rails 13 extend in the front-rear direction. Lower rails 13 are fixed to a floor of the vehicle. Upper rails 14 are disposed on upper surfaces of respective ones of lower rails 13. Upper rails 14 are slidably combined with lower rails 13 in the front-rear direction.

Base plate 31 includes a metal plate material. Base plate 31 is disposed parallel to a horizontal direction. Base plate 31 is connected to upper rails 14. Base plate 31 is bridged between upper rail 14 on slide rail 12R and upper rail 14 on slide rail 12L, in the left-right direction. Base plate 31 faces a floor panel of the vehicle in a vertical direction with an interval therebetween. Seat main body 10 is mounted on base plate 31.

Slide rails 12 enable seat main body 10 to perform a slide operation within a predetermined range in the front-rear direction. Seat main body 10 can perform a slide operation between a front-most (F/M) position and a rear-most (R/M) position. The F/M position corresponds to a front end part of the predetermined range, in which seat main body 10 can slide in the front-rear direction, and the R/M position corresponds to a rear end part of the predetermined range, in which seat main body 10 can slide in the front-rear direction. FIGS. 1 and 2 illustrate seat main body 10 when seat main body 10 is slid to the R/M position.

Seat main body 10 can perform a predetermined operation independent of the slide operation in the front-rear direction. In the present preferred embodiment, seat main body 10 can perform a rotational operation between a seated position 10A and a getting on-and-off position 10B. The slide operation of seat main body 10 and the rotational operation of seat main body 10 are not simultaneously performed.

Seat main body 10 further includes a first support frame 18, a second support frame 19, and a rotation plate 21.

First support frame 18 and second support frame 19 extend in the left-right direction. First support frame 18 and second support frame 19 are connected to cushion frame 16 at their both ends extending in the left-right direction. First support frame 18 and second support frame 19 are provided at an interval in the front-rear direction.

Rotation plate 21 is provided above base plate 31. Rotation plate 21 is supported by first support frame 18 and second support frame 19. Rotation plate 21 is bridged between first support frame 18 and second support frame 19 in the front-rear direction.

Vehicle seat 100 further includes a coupling unit 23. Coupling unit 23 is provided between base plate 31 and rotation plate 21 in the vertical direction. Coupling unit 23 couples base plate 31 and rotation plate 21 to each other such that rotation plate 21 is rotatable with respect to base plate 31. Coupling unit 23 couples base plate 31 and rotation plate 21 to each other such that seat main body 10 can rotate between seated position 10A and getting on-and-off position 10B.

A vehicle is provided with an entrance 132 to be used when an occupant (driver) gets on and off. Entrance 132 opens on a lateral side of vehicle seat 100. Entrance 132 opens in front of a pillar 131 disposed between vehicle seat 100 and a seat behind vehicle seat 100.

Seated position 10A is a position of seat main body 10 to be selected when the occupant drives the vehicle. When seat main body 10 is disposed at seated position seat main body 10 faces a steering wheel 134 of the vehicle in the front-rear direction. The occupant seated on seat main body 10 faces forward.

Getting on-and-off position 10B is a position of seat main body 10 to be selected when the occupant gets on and off vehicle seat 100. When seat main body 10 is disposed at getting on-and-off position 10B, a right-front end part of seat main body protrudes to an outside of the vehicle through entrance 132. The driver seated on seat main body 10 faces diagonally forward right.

Seat main body 10 rotates from seated position 10A toward getting on-and-off position 10B while shifting forward in such a manner as to draw an arc extending diagonally forward right. Seat main body 10 rotates from getting on-and-off position toward seated position 10A while shifting backward in such a manner as to draw an arc extending diagonally backward left. Such a rotational operation enables seat main body 10 to move between seated position 10A and getting on-and-off position 10B while avoiding interference between seat main body 10 and pillar 131.

In one example, coupling unit 23 includes a guide member that linearly guides rotation plate 21 in an oblique direction with respect to the front-rear direction and the left-right direction, and includes a link mechanism that rotates rotation plate 21 so as to change a direction of rotation plate 21 in a horizontal plane. Coupling unit 23 is a manual type in which seat main body 10 is rotated by an external force applied by the occupant.

Figure 3:
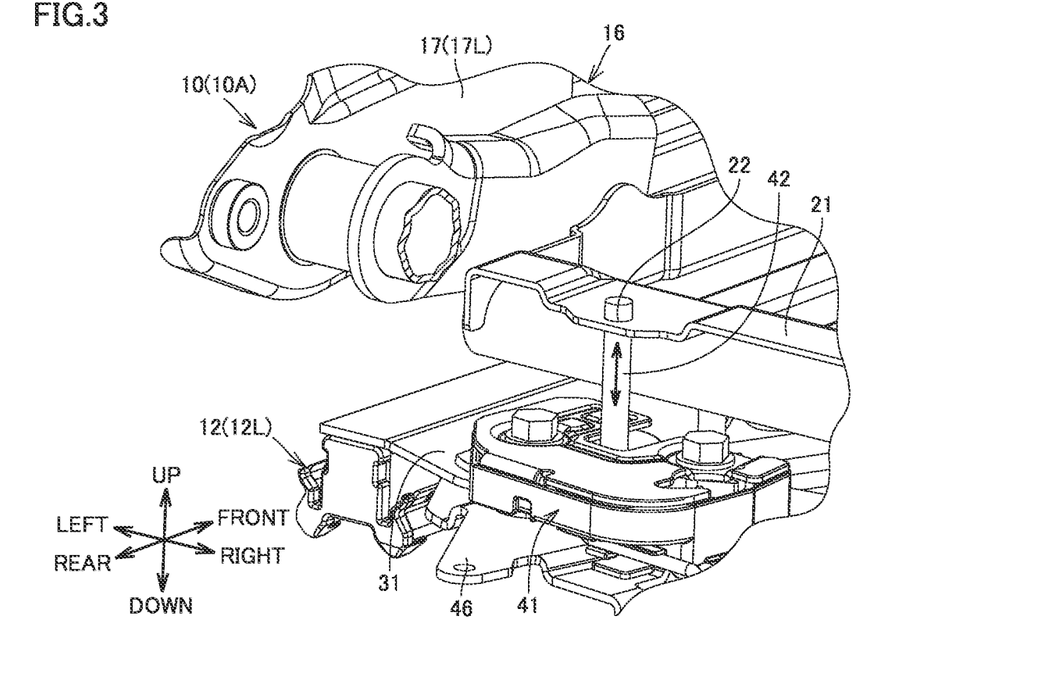
FIG. 3 is a perspective view illustrating the vehicle seat as viewed in a direction indicated by arrow III in FIG. 1.
Figure 4:
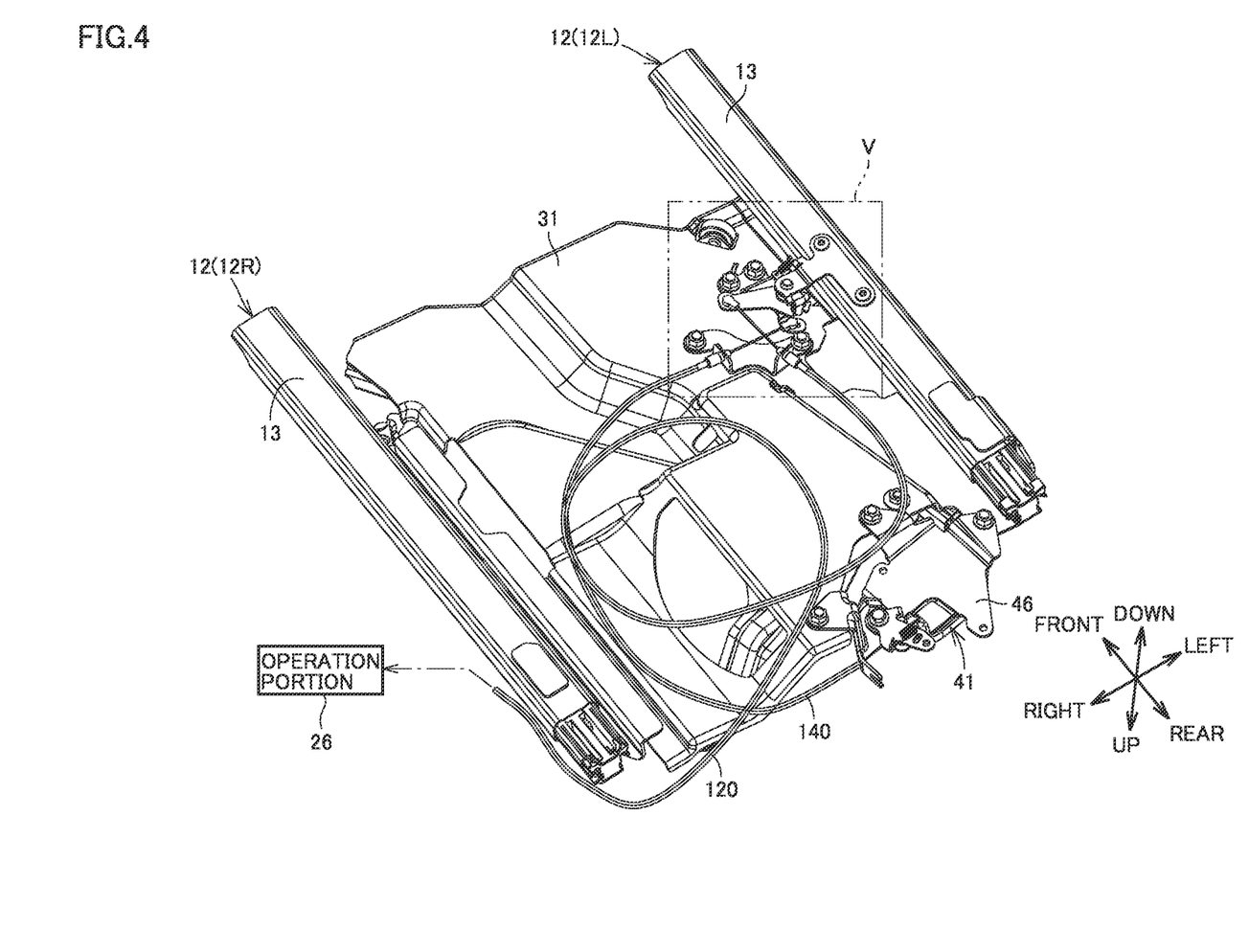
FIG. 4 is a perspective view of the vehicle seat in FIG. 1 as viewed from a bottom side.

FIG. 3 is a perspective view illustrating the vehicle seat as viewed in a direction indicated by arrow III in FIG. 1. FIG. 4 is a perspective view oldie vehicle seat in FIG. 1 as viewed from a bottom side. With reference to FIGS. 1 to 4, vehicle seat 100 further includes a lock mechanism portion 41. Lock mechanism portion 41 restricts a rotational operation of seat main body 10.

Lock mechanism portion 41 is attached to base plate 31. Lock mechanism portion 41 is attached to base plate 31 with an attachment plate 46 interposed therebetween. Lock mechanism portion 41 is attached to a rear end part of base plate 31. Lock mechanism portion 41 is provided between base plate 31 and rotation plate 21 in the vertical direction. Lock mechanism portion 41 includes a pin member 42. Pin member 42 extends in the vertical direction. Pin member 42 is supported to be slidable in an axial direction of pin member 42 (vertical direction). Rotation plate 21 is provided with a pin insertion hole 22. Pin insertion hole 22 is a through-hole penetrating rotation plate 21 in the vertical direction. When seat main body 10 is disposed at seated position 10A, pin insertion hole 22 faces pin member 42 in the vertical direction.

Lock mechanism portion 41 includes therein: a spring mechanism that applies an elastic force to pin member 42 to slide pin member 42 toward pin insertion hole 22; and a drive mechanism that slides pin member 42 in a direction in which pin member 42 is disengaged from pin insertion hole 22 when receiving a tensile force from a second wire 140 to be described later.

When pin member 42 is inserted into pin insertion hole 22 (lock operation), a rotational operation of seat main body 10 from seated position 10A toward getting on-and-off position 10B is restricted. When pin member 42 is disengaged from pin insertion hole 22 (unlock operation), a rotational operation of seat main body 10 from seated position 10A toward getting on-and-off position 10B is allowed.

Vehicle seat 100 further includes an operation portion 26. Operation portion 26 is operated by an occupant to cause lock mechanism portion 41 to perform the unlock operation. Operation portion 26 is manually operated by the occupant. Lock mechanism portion 41 performs the unlock operation by an operation force being transmitted from operation portion 26.

Operation portion 26 is provided on seat main body 10. Operation portion 26 is attached to cushion frame 16 (side frame 17). Operation portion 26 has a lever shape and is provided to be turnable about a central axis 110 extending in the left-right direction. Operation portion 26 turns by a predetermined angle about central axis 110 by a lever operation by the occupant.

In the present preferred embodiment, when seat main body 10 is slid to the RIM position, the operation force from operation portion 26 is transmitted to lock mechanism portion 41, and when seat main body 10 is slid to a position different from the R/M position, the operation force from operation portion 26 is not transmitted to lock mechanism portion 41. Since the rotational operation of seat main body 10 is allowed only when seat main body 10 is slid to the R/M position, it is possible to avoid interference between seat main body 10 and various structures around an instrument panel such as steering wheel 134.

Hereinafter, a description will be given to a mechanism for transmitting the operation force from operation portion 26 toward lock mechanism portion 41.

Figure 5:
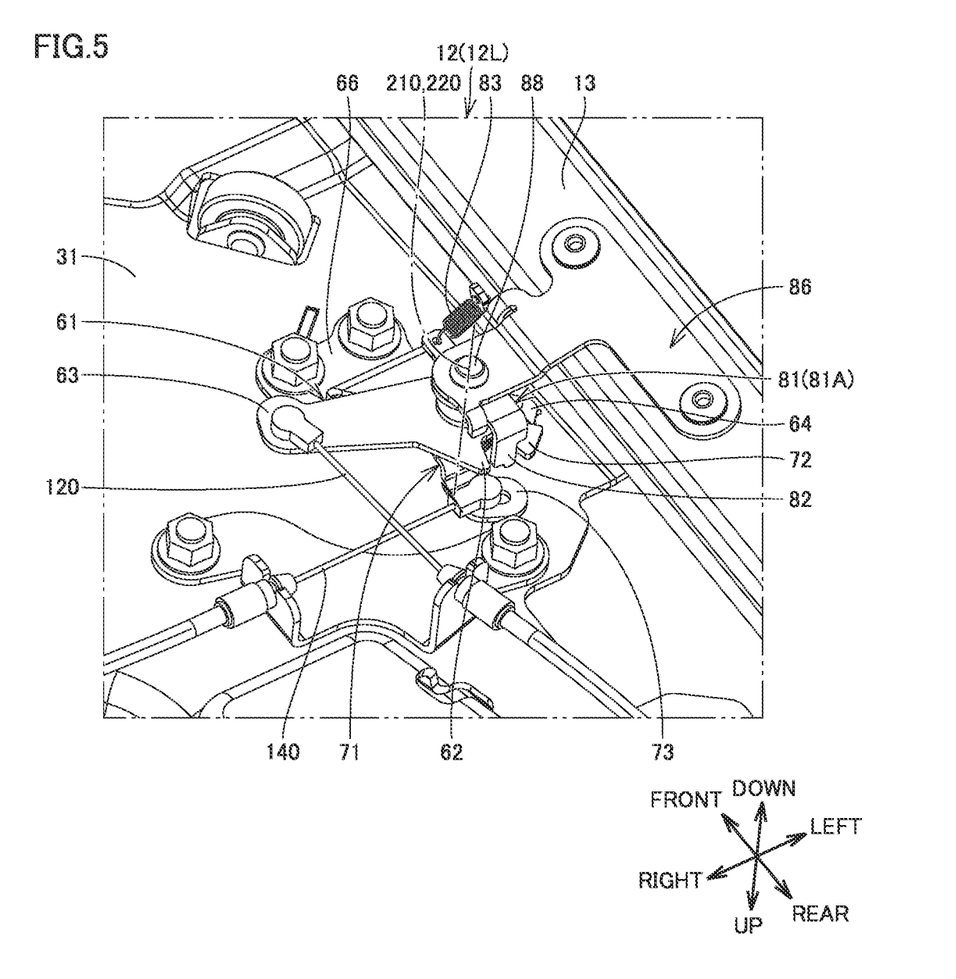
FIG. 5 is a perspective view illustrating the vehicle seat in an area surrounded by two-dot chain line V in FIG. 4 when the seat main body is slid to a rear-most (RIM) position.
Figure 6:
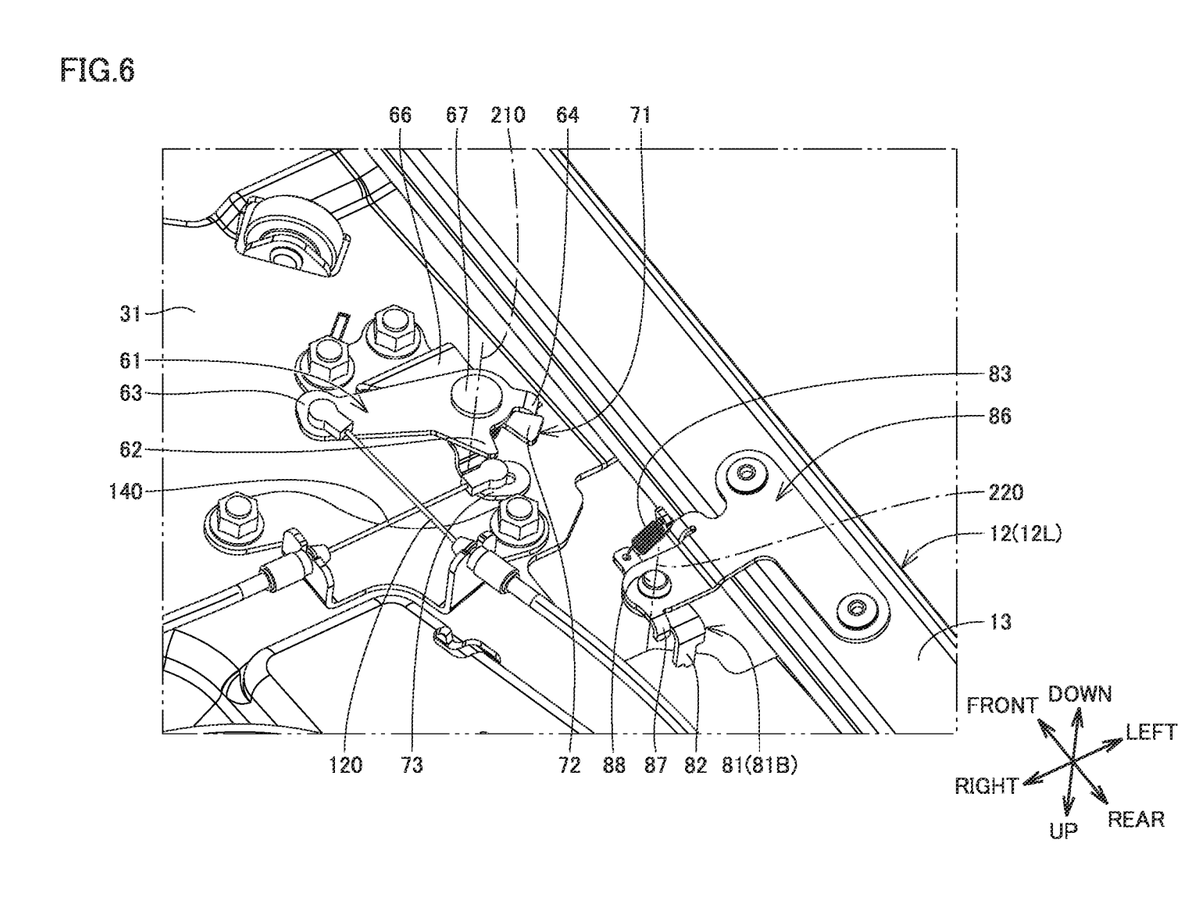
FIG. 6 is a perspective view illustrating the vehicle seat corresponding to the area surrounded by the two-dot chain line V in FIG. 4 when the seat main body is slid to a position different from the R/M position.
Figure 7:
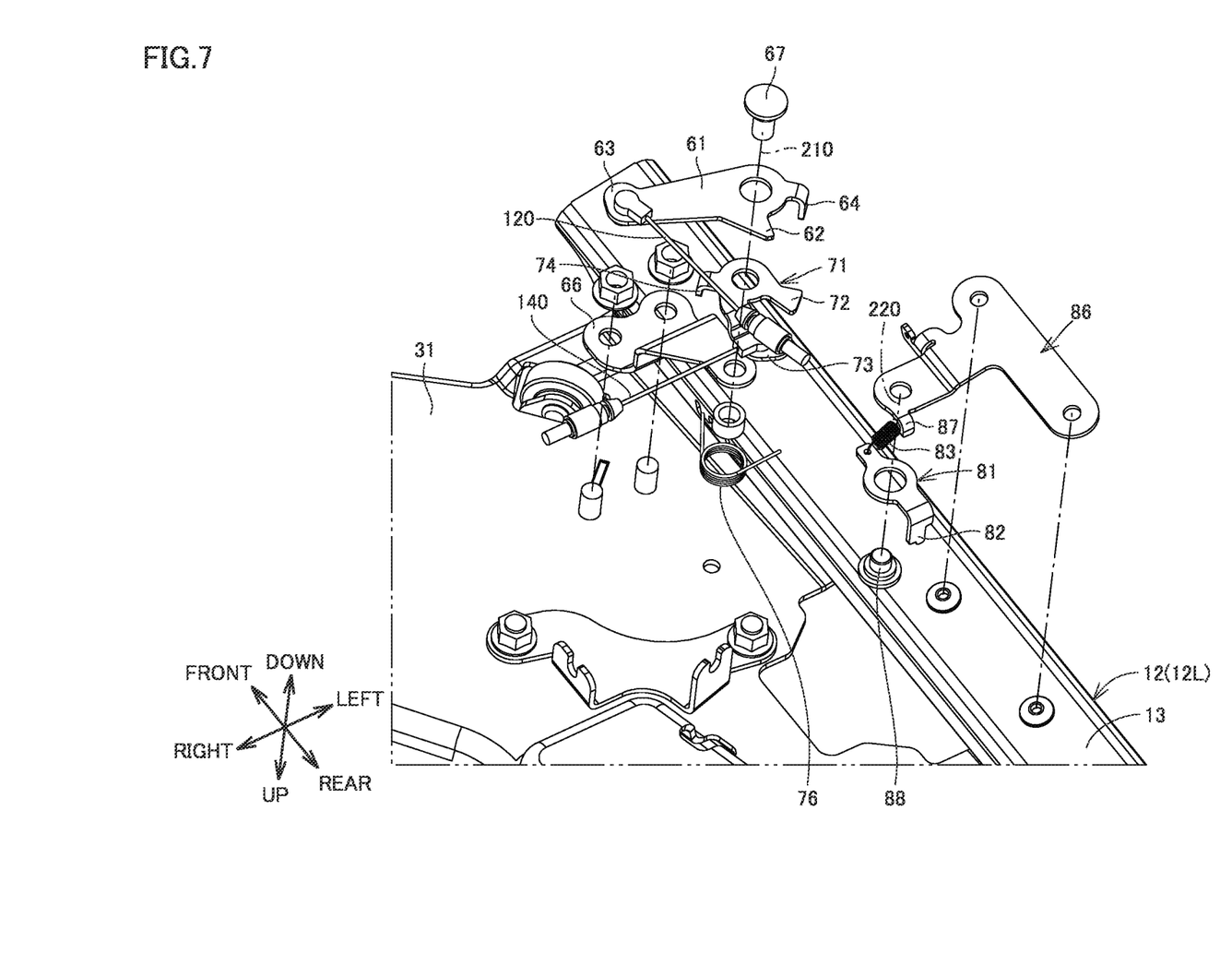
FIG. 7 is an exploded view illustrating the vehicle seat in FIGS. 5 and 6.

FIG. 5 is a perspective view illustrating the vehicle seat in an area surrounded by two-dot chain line V in FIG. 4 when the seat main body is slid to a rear-most (R/M) position. FIG. 6 is a perspective view illustrating the vehicle seat corresponding to the area surrounded by the two-dot chain line V in FIG. 4 when the seat main body is slid to a position different from the R/M position. FIG. 7 is an exploded view illustrating the vehicle seat in FIGS. 5 and 6.

With reference to FIGS. 4 to 7, vehicle seat 100 further includes a first member 61, an intermediate member 81, and a second member 71.

An operation force from operation portion 26 is transmitted to first member 61. Second member 71 transmits the operation force from operation portion 26 toward lock mechanism portion 41.

As illustrated in FIG. 5, when seat main body 10 is slid to the R/M position, intermediate member 81 is disposed at a first position 81A with respect to first member 61 and second member 71, and at which intermediate member 81 is engaged with first member 61 and second member 71. Intermediate member 81 transmits the operation force from operation portion 26 from first member 61 to second member 71. As illustrated in FIG. 6, when seat main body 10 is slid to a position different from the RIM position, intermediate member 81 is disposed at a second position 81B with respect to first member 61 and second member 71, at which intermediate member 81 is not engaged with first member 61 and second member 71. Intermediate member 81 does not transmit the operation force from operation portion 26, from first member 61 to second member 71.

More specifically, vehicle seat 100 further includes a first wire 120, second wire 140, a first attachment bracket 66, a first center pin 67, and a first coil spring 76.

First wire 120 extends between operation portion 26 and first member 61. When the driver operates operation portion 26, first wire 120 is pulled toward operation portion 26. Second wire 140 extends between second member 71 and lock mechanism portion 41. When second wire 140 is pulled toward second member 71, lock mechanism portion 41 performs the unlock operation.

First member 61 and second member 71 are attached to base plate 31. First member 61 and second member 71 are attached to base plate 31 with first attachment bracket 66 interposed therebetween. First member 61 and second member 71 slide together with seat main body 10 in the front-rear direction when seat main body 10 is slid.

First member 61 and second member 71 are disposed between the floor panel of the vehicle and base plate 31 in the vertical direction. First member 61 and second member 71 are disposed adjacent to slide rail 12 (slide rail 12L) in the left-right direction.

First member 61 and second member 71 are provided to be turnable about first central axis 210. First central axis 210 extends in the vertical direction. First member 61 and second member 71 are stacked on each other in an axial direction of first central axis 210. Second member 71 is disposed between base plate 31 and first member 61 in the axial direction of first central axis 210.

First center pin 67 extends axially on first central axis 210. First center pin 67 is inserted through first member 61 and second member 71 in the axial direction of first central axis 210, and is connected to first attachment bracket 66.

First member 61 includes a first claw portion 62, a first connection portion 63, and a first locking portion 64. First claw portion 62 is configured to protrude outward in a radial direction of first central axis 210. First claw portion 62 is formed of a plate body having a thickness direction in the vertical direction and extending parallel to the horizontal plane.

First connection portion 63 protrudes outward in the radial direction of first central axis 210 at a position shifted from first claw portion 62 in a circumferential direction of first central axis 210. First wire 120 is connected to first connection portion 63. First wire 120 extends from first connection portion 63 along the circumferential direction of first central axis 210. First locking portion 64 protrudes outward in the radial direction of first central axis 210 at a position shifted from first claw portion 62 and first connection portion 63 in the circumferential direction of first central axis 210, and an end of the protruding portion of first locking portion 64 is bent in such a direction that the end of the protruding portion gets close to base plate 31.

Second member 71 includes a second claw portion 72, a second connection portion 73, and a second locking portion 74. Second claw portion 72 protrudes outward in the radial direction of first central axis 210 at a position shifted from first claw portion 62 in the axial direction and the circumferential direction of first central axis 210. First claw portion 62 and second claw portion 72 are provided at an interval in the circumferential direction of first central axis 210. Second claw portion 72 is formed of a plate body having a thickness direction in the vertical direction and extending parallel to the horizontal plane.

Second connection portion 73 protrudes outward in the radial direction of first central axis 210 at a position shifted from second claw portion 72 in a circumferential direction of first central axis 210. Second wire 140 is connected to second connection portion 73. Second wire 140 extends from second connection portion 73 along the circumferential direction of first central axis 210. Second locking portion 74 protrudes outward in the radial direction of first central axis 210 at a position shifted from second claw portion 72 and second connection portion 73 in the circumferential direction of first central axis 210, and an end of the protruding portion of second locking portion 74 is bent in such a direction that the end of the protruding portion gets close to base plate 31.

First coil spring 76 is fitted on an outer periphery of first center pin 67. One end of first coil spring 76 is locked by first locking portion 64, and the other end of first coil spring 76 is locked by second locking portion 74. First coil spring 76 is provided to apply an elastic force in the circumferential direction of first central axis 210, to first member 61 and second member 71.

In the bottom views illustrated in FIGS. 4 to 7, first member 61 is biased by the elastic force of first coil spring 76, in a clockwise direction about first central axis 210. The elastic force acting on first member 61 from first coil spring 76 corresponds to a pulling force that pulls first wire 120 from operation portion 26 toward first member 61. Second member 71 is biased in a counterclockwise direction about first central axis 210 by the elastic force of first coil spring 76. The elastic force acting on second member 71 from first coil spring 76 corresponds to a pulling force that pulls second wire 140 from lock mechanism portion 41 toward second member 71.

As illustrated in FIG. 6, second claw portion 72 is disposed between first claw portion 62 and first locking portion 64 in the circumferential direction of first central axis 210. Second claw portion 72 and first locking portion 64 are in contact with each other in the circumferential direction of first central axis 210 by the elastic force of first coil spring 76. Between second claw portion 72 and first claw portion 62 there is provided a gap in the circumferential direction of first central axis 210.

Vehicle seat 100 further includes a second attachment bracket 86, a second center pin 88, and a second coil spring 83.

Intermediate member 81 is attached to lower rail 13 of slide rail 12 (12L). Intermediate member 81 is attached to lower rail 13 via second attachment bracket 86. Intermediate member 81 remains stationary during the slide operation of seat main body 10. A relative positional relationship between both of first member 61 and second member 71 and intermediate member 81 in the front-rear direction changes with the slide operation of seat main body 10.

Intermediate member 81 is disposed between the floor panel of the vehicle and base plate 31 in the vertical direction. Both of first member 61 and second member 71 and intermediate member 81 are arranged on a straight line in the front-rear direction.

Intermediate member 81 is provided to be rotatable about a second central axis 220. Second central axis 220 extends in the vertical direction. Second center pin 88 extends axially on second central axis 220. Second center pin 88 is inserted through intermediate member 81 in an axial direction of second central axis 220 and connected to second attachment bracket 86.

Intermediate member 81 has a third claw portion 82. Third claw portion 82 protrudes outward in a radial direction of second central axis 220, and an end of the protruding portion of third claw portion 82 is bent in such a direction that the end of the protruding portion gets close to base plate 31.

Second attachment bracket 86 has a rotation stopper portion 87. Rotation stopper portion 87 protrudes outward in the radial direction of second central axis 220 at a position shifted from third claw portion 82 in the circumferential direction of second central axis 220, and an end of the protruding portion of rotation stopper portion 87 is bent in such a direction that the end of the protruding portion gets close to base plate 31.

Second coil spring 83 is extended between intermediate member 81 and second attachment bracket 86. Second coil spring 83 is provided so as to apply an elastic force in the circumferential direction of second central axis 220 to intermediate member 81. In the bottom views illustrated in FIGS. 4 to 7, intermediate member 81 is biased by the elastic force of second coil spring 83 in a clockwise direction about second central axis 220. Third claw portion 82 and rotation stopper portion 87 are in contact with each other in the circumferential direction of second central axis 220 by the elastic force of second coil spring 83.

As illustrated in FIG. 5, intermediate member 81 is disposed at first position 81A with respect to first member 61 and second member 71 when seat main body 10 is slid to the RIM position. In this case, first central axis 210 and second central axis 220 extend in a straight line in the vertical direction. Intermediate member 81 is disposed to face first member 61 and second member 71 in the axial direction of first central axis 210 and second central axis 220. Intermediate member 81 is disposed between the floor panel of the vehicle and first member 61.

Third claw portion 82 is inserted between first claw portion 62 and second claw portion 72 in the circumferential direction of first central axis 210 (second central axis 220), whereby intermediate member 81 is engaged with first member 61 and second member 71.

When operation portion 26 is lever-operated, first wire 120 is pulled toward operation portion 26, whereby first member 61 turns counterclockwise about first central axis 210. Along with the turning operation of first member 61, first claw portion 62 pushes second claw portion 72 of second member 71 in the circumferential direction of first central axis 210 via third claw portion 82 of intermediate member 81, whereby second member 71 turns counterclockwise about first central axis 210. As a result, intermediate member 81 transmits the operation force received from operation portion 26, from first member 61 to second member 71. Along with the turning operation of second member 71, second wire 140 is pulled toward second member 71, whereby lock mechanism portion 41 performs the unlock operation.

As illustrated in FIG. 6, intermediate member 81 is disposed at second position 81B with respect to first member 61 and second member 71 when seat main body 10 is slid to a position different from the R/M position. Intermediate member 81 (second central axis 220) and both of first member 61 and second member 71 (first central axis 210) are disposed apart from each other in the front-rear direction. Intermediate member 81 (second central axis 220) is disposed on a rear side with respect to first member 61 and second member 71 (first central axis 210).

Being separated from between first claw portion 62 and second claw portion 72 in the circumferential direction of first central axis 210, intermediate member 81 is disengaged from first member 61 and second member 71.

When operation portion 26 is lever-operated, first wire 120 is pulled toward operation portion 26, whereby first member 61 turns counterclockwise about first central axis 210. Since first claw portion 62 and second claw portion 72 are provided to be shifted in the axial direction of first central axis 210, first claw portion 62 does not push second claw portion 72 in the circumferential direction of first central axis 210. As a result, intermediate member 81 does not transmit the operation force received from operation portion 26, from first member 61 to second member 71. Since second member 71 remains stationary, lock mechanism portion 41 does not perform the unlock operation.

In the present preferred embodiment, first member 61 and second member 71 are attached to base plate 31 on which seat main body 10 is mounted, and intermediate member 81 is attached to lower rail 13 fixed to the floor panel of the vehicle. With such a configuration, a positional relationship, in the front-rear direction, between both of first member 61 and second member 71 and intermediate member 81 changes along with the slide operation of seat main body 10. Therefore, by using a simple structure, it is possible to achieve a configuration in which intermediate member 81 is moved between first position 81A and second position 81B, with respect to first member 61 and second member 71.

In the present preferred embodiment, when intermediate member 81 is disposed at first position 81A, first central axis 210 and second central axis 220 extend in a straight line in the vertical direction. With such a configuration, when first member 61, second member 71, and intermediate member 81 turn about first central axis 210 and second central axis 220, the positional relationship between both of first claw portion 62 and second claw portion 72 and third claw portion 82 interposed between first claw portion 62 and second claw portion 72 can be maintained. As a result, first member 61, second member 71, and intermediate member 81 can be made compact.

To summarize the structure of vehicle seat 100 according to the first preferred embodiment of the present invention described above, a vehicle seat 100 in the present preferred embodiment includes: seat main body 10 that can perform a slide operation and a rotational operation as a predetermined operation independent of the slide operation; lock mechanism portion 41 that restricts the rotational operation of seat main body 10; operation portion 26 that is operated by an occupant to cause lock mechanism portion 41 to perform an unlock operation; first member 61 to which an operation force from operation portion 26 is transmitted; second member 71 that transmits the operation force toward lock mechanism portion 41; and intermediate member 81 that is disposed, when seat main body 10 is slid to an R/M position as a specific position, at a first position 81A with respect to first member 61 and second member 71 and at which intermediate member 81 is engaged with first member 61 and second member 71, and transmits the operation force from first member 61 to second member 71, the intermediate member 81 being disposed, when seat main body 10 is slid to a position different from the RIM position, at second position 81B with respect to first member 61 and second member 71 and at which intermediate member 81 is disengaged from first member 61 and second member 71, and does not transmit the operation force from first member 61 to second member 71.

With vehicle seat 100 of the first preferred embodiment of the present invention configured as described above, lock mechanism portion 41 can be made to perform the unlock operation only when seat main body 10 is slid to the R/M position.

In the present invention, the specific position where the lock mechanism portion can be made to perform the unlock operation is not particularly limited, and may be, for example, the F/M position, or may be the position of one end part in the left-right direction in a case where the seat main body in the present invention slides in the left-right direction. The predetermined operation in the present invention that the seat main body can perform is not limited to a rotational operation, and may be, for example, a space-up operation in which the seat main body is flipped up toward a side part of a vehicle.

Second Preferred Embodiment

Figure 8:
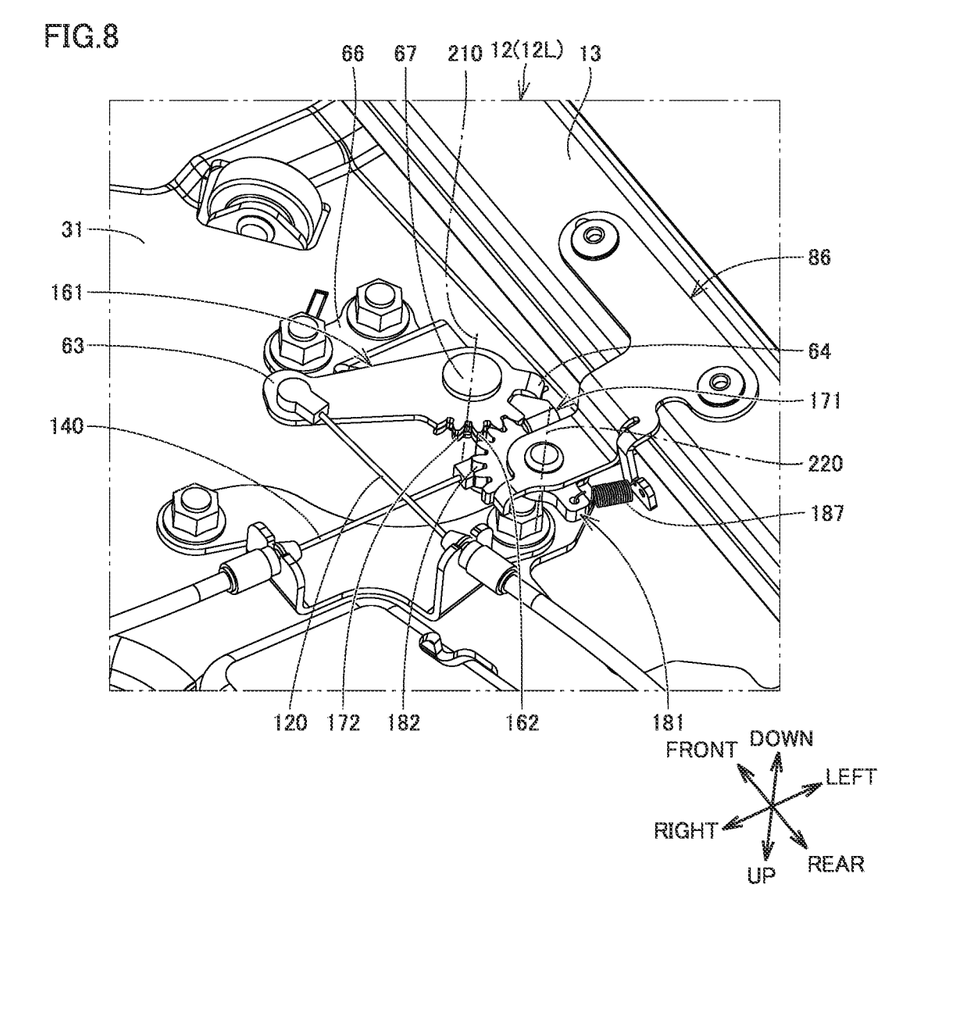
FIG. 8 is a perspective view illustrating a vehicle seat according to a second preferred embodiment of the present invention when a seat main body is slid to an RIM position.
Figure 9:
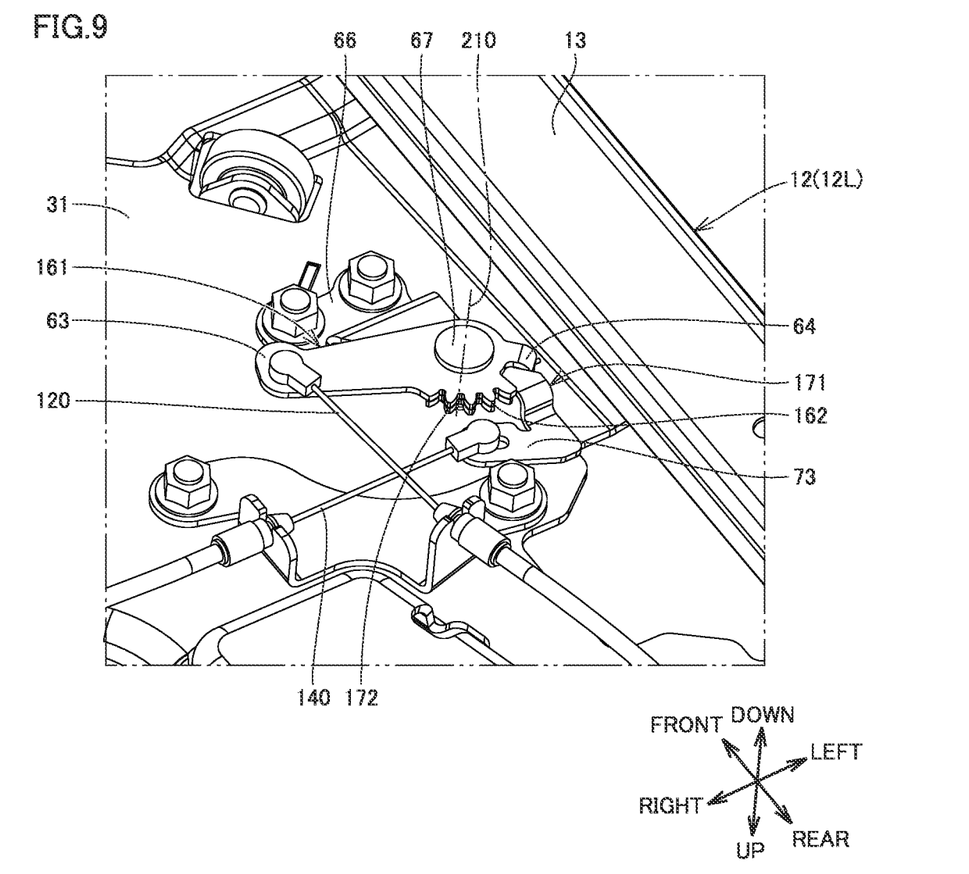
FIG. 9 is a perspective view illustrating the vehicle seat according to the second preferred embodiment of the present invention when the seat main body is slid to a position different from the R/M position.
Figure 10:
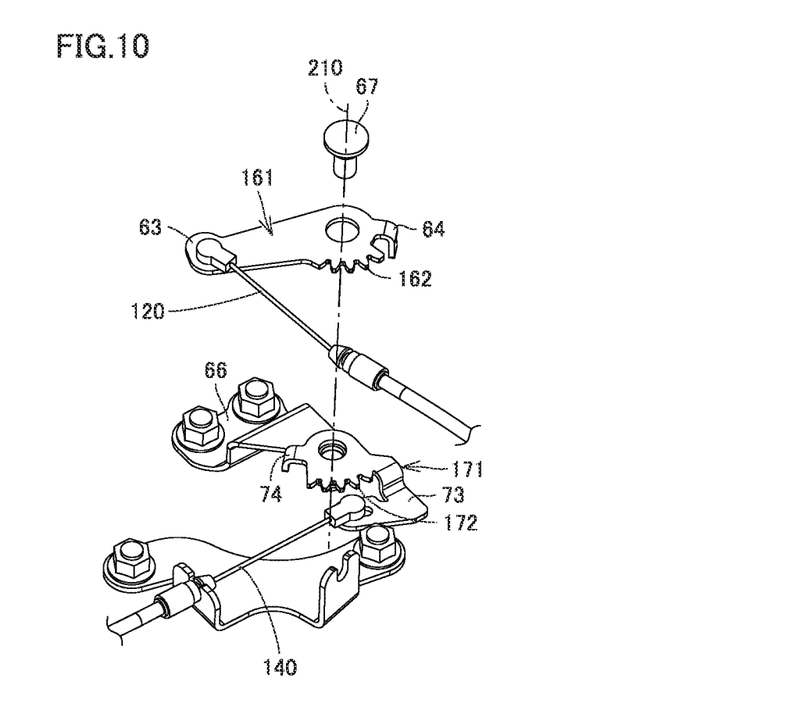
FIG. 10 is an exploded view illustrating the vehicle seat in FIG. 9.

FIG. 8 is a perspective view illustrating a vehicle seat according to a second preferred embodiment of the present invention when a seat main body is slid to an R/M position. FIG. 9 is a perspective view illustrating the vehicle seat according to the second preferred embodiment of the present invention when the seat main body is slid to a position different from the R/M position. FIG. 10 is an exploded view illustrating the vehicle seat in FIG. 9.

The vehicle seat according to the present preferred embodiment basically has a similar structure to vehicle seat 100 according to the first preferred embodiment. Hereinafter, description of overlapping structures will not be repeated.

With reference to FIGS. 8 to 10, a vehicle seat 100 according to the present preferred embodiment includes a first member 161 instead of first member 61 in the first preferred embodiment, a second member 171 instead of second member 71 in the first preferred embodiment, and an intermediate member 181 instead of intermediate member 81 in the first preferred embodiment.

First member 161 includes a first gear portion 162 instead of first claw portion 62 in the first preferred embodiment. First gear portion 162 is configured such that a plurality of teeth are arranged in a circumferential direction of a first central axis 210. First gear portion 162 is formed of a plate body having a thickness direction in a vertical direction and extending parallel to a horizontal plane.

Second member 171 includes a second gear portion 172 instead of second claw portion 72 in the first preferred embodiment. Second gear portion 172 is configured such that a plurality of teeth are arranged in the circumferential direction of first central axis 210, at a position shifted in an axial direction of first central axis 210 with respect to first gear portion 162. First gear portion 162 and second gear portion 172 are laminated on each other in the axial direction of first central axis 210.

Intermediate member 181 includes a third gear portion 182 instead of third claw portion 82 in the first preferred embodiment. Third gear portion 182 is configured such that a plurality of teeth are arranged in a circumferential direction of a second central axis 220. Third gear portion 182 is provided to face first gear portion 162 and second gear portion 172, in a front-rear direction. A range of third gear portion 182 in an axial direction of second central axis 220 extends over a range of first gear portion 162 and second gear portion 172 in the axial direction of first central axis 210.

As illustrated in FIG. 8, when seat main body 10 is slid to the R/M position, third gear portion 182 meshes with first gear portion 162 and second gear portion 172, whereby intermediate member 181 is engaged with first member 161 and second member 171. At this time, intermediate member 181 transmits the operation force from operation portion 26, from first member 161 to second member 171, whereby lock mechanism portion 41 performs the unlock operation.

As illustrated in FIG. 9, when seat main body 10 is slid to a position different from the R/M position, third gear portion 182 is disengaged from first gear portion 162 and second gear portion 172, whereby the intermediate member 181 is disengaged from first member 161 and second member 171. At this time, intermediate member 181 does not transmit the operation force from operation portion 26, from first member 161 to second member 171, whereby lock mechanism portion 41 does not perform the unlock operation.

The vehicle seat of the second preferred embodiment of the present invention configured as described above can provide similar effects to vehicle seat 100 of the first preferred embodiment.

Although the preferred embodiments of the present invention have been described, it should be considered that the preferred embodiments disclosed herein are illustrative in all respects and not restrictive. The scope of the present invention is defined by the claims, and it is intended that the scope of the present invention includes all modifications within meanings and scope that are equivalent to the scope of the claims.

What is claimed is:
1. A vehicle seat comprising:
a seat main body that performs a slide operation and a predetermined operation independent of the slide operation;

a lock mechanism portion that restricts the predetermined operation of the seat main body;
an operation portion that is operated by an occupant to cause the lock mechanism portion to perform an unlock operation;
a first member to which an operation force from the operation portion is transmitted;
a second member that transmits the operation force toward the lock mechanism portion; and
an intermediate member that is disposed, when the seat main body is slid to a specific position, at a first position with respect to the first member and the second member and at which the intermediate member is engaged with the first member and the second member, and performs transmission of the operation force from the first member to the second member, the intermediate member being disposed, when the seat main body is slid to a position different from the specific position, at a second position with respect to the first member and the second member and at which the intermediate member is disengaged from the first member and the second member, and interrupts the transmission of the operation force from the first member to the second member.

2. The vehicle seat according to claim 1, further comprising:
a lower rail fixed to a floor of a vehicle;
an upper rail slidably assembled to the lower rail; and
a base plate connected to the upper rail and on which the seat main body is mounted,
wherein the first member and the second member are attached to the base plate, and
the intermediate member is attached to the lower rail.

3. The vehicle seat according to claim 1, wherein
each member of the first member and the second member is provided to be turnable about a first central axis,
the intermediate member is provided to be turnable about a second central axis,
the first member includes a first claw portion protruding outward in a radial direction of the first central axis,
the second member includes a second claw portion protruding outward in the radial direction of the first central axis, at a position shifted with respect to the first claw portion in an axial direction and a circumferential direction of the first central axis, and
the intermediate member includes a third claw portion that is interposed between the first claw portion and the second claw portion in the circumferential direction of the first central axis when the intermediate member is disposed at the first position.

4. The vehicle seat according to claim 3, wherein the first central axis and the second central axis extend in a straight line when the intermediate member is disposed at the first position.

5. The vehicle seat according to claim 1, wherein
each member of the first member and the second member is provided to be turnable about a first central axis,
the intermediate member is provided to be turnable about a second central axis,
the first member includes a first gear portion having a plurality of teeth arranged in a circumferential direction of the first central axis,
the second member includes a second gear portion having a plurality of teeth arranged, at a position shifted in an axial direction of the first central axis with respect to the first gear portion, in the circumferential direction of the first central axis, and
the intermediate member includes a third gear portion having a plurality of teeth arranged in a circumferential direction of the second central axis and that meshes with the first gear portion and the second gear portion when the intermediate member is disposed at the first position.

6. The vehicle seat according to claim 1, wherein
the seat main body performs a slide operation within a predetermined range in a front-rear direction, and
the specific position is a rear end part of the predetermined range.

* * * * *